US009225448B2

(12) United States Patent
Seo et al.

(10) Patent No.: US 9,225,448 B2
(45) Date of Patent: Dec. 29, 2015

(54) METHOD AND APPARATUS FOR TRANSMITTING ACK/NACK IN TDD-BASED WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 13/993,623

(22) PCT Filed: Jan. 2, 2012

(86) PCT No.: PCT/KR2012/000006
§ 371 (c)(1), (2), (4) Date: Jun. 12, 2013

(87) PCT Pub. No.: WO2012/091532
PCT Pub. Date: Jul. 5, 2012

(65) Prior Publication Data
US 2013/0258914 A1 Oct. 3, 2013

Related U.S. Application Data

(60) Provisional application No. 61/429,174, filed on Jan. 2, 2011, provisional application No. 61/430,186, filed on Jan. 6, 2011, provisional application No. 61/521,732, filed on Aug. 9, 2011.

(51) Int. Cl.
*H04J 3/16* (2006.01)
*H04L 1/18* (2006.01)
*H04L 1/16* (2006.01)

(52) U.S. Cl.
CPC ............ *H04J 3/1694* (2013.01); *H04L 1/1861* (2013.01); *H04L 1/1864* (2013.01); *H04L 1/1896* (2013.01); *H04L 1/1664* (2013.01)

(58) Field of Classification Search
USPC .......................................................... 370/280
See application file for complete search history.

(56) References Cited

U.S. PATENT DOCUMENTS

2009/0323617 A1 12/2009 Che et al.
2011/0280164 A1* 11/2011 Luo et al. .................... 370/281
(Continued)

FOREIGN PATENT DOCUMENTS

CN 101499882 8/2009
CN 101789851 7/2010
KR 10-2010-0074328 7/2010

OTHER PUBLICATIONS

Chen et al., U.S. Appl. No. 61/374,210, filed Aug. 16, 2010.*
(Continued)

*Primary Examiner* — Noel Beharry
*Assistant Examiner* — Thomas D Busch
(74) *Attorney, Agent, or Firm* — Lee, Hong, Degerman, Kang & Waimey

(57) ABSTRACT

Provided are a method and apparatus for transmitting positive-acknowledgement (ACK)/negative-acknowledgement (NACK) in a time division duplex (TDD)-based wireless communication system. A user equipment receives an uplink grant which includes an uplink resource assignment and an uplink downlink assignment index (DAI), determines an ACK/NACK payload size on the basis of a value of the uplink DAI, and generates an ACK/NACK response for the at least one downlink transport block. The user equipment multiplexes the ACK/NACK response on an uplink transport block, and transmits the multiplexed ACK/NACK response.

5 Claims, 17 Drawing Sheets

(56) References Cited

U.S. PATENT DOCUMENTS

2012/0039279 A1* 2/2012 Chen et al. .................... 370/329
2012/0087349 A1* 4/2012 Zhu .............................. 370/336

OTHER PUBLICATIONS

Korean Intellectual Property Office Application Serial No. 10-2013-7013511, Notice of Allowance dated Sep. 24, 2014, 3 pages.

LG Electronics, "DAI in UL grant for LTE-A TDD," 3GPP TSG RAN WG1 #63, R1-106128, Nov. 2010, 3 pages.

Catt, "UL ACK/NACK Transmission Design in FDD with CA," 3GPP TSG RAN WG1 Meeting #60, R1-100876, Feb. 2010, 5 pages.

Catt, "UL ACK/NACK Transmission for TDD in Rel-10," 3GPP TSG RAN WG1 Meeting #62bis, R1-105151, Oct. 2010, 7 pages.

The State Intellectual Property Office of the People's Republic of China Application Serial No. 201280004542.5, Office Action dated Jun. 3, 2015, 5 pages.

* cited by examiner

METHOD AND APPARATUS FOR TRANSMITTING ACK/NACK IN TDD-BASED WIRELESS COMMUNICATION SYSTEM

CROSS-REFERENCE TO RELATED APPLICATIONS

This application is the National Stage filing under 35 U.S.C. 371 of International Application No. PCT/KR2012/000006, filed on Jan. 2, 2012, which claims the benefit of U.S. Provisional Application Ser. No. 61/429,174, filed on Jan. 2, 2011, U.S. Provisional Application Ser. No. 61/430,186, filed on Jan. 6, 2011, and U.S. Provisional Application Ser. No. 61/521,732, filed on Aug. 9, 2011, the contents of which are all hereby incorporated by reference herein in their entirety.

TECHNICAL FIELD

The present invention relates to wireless communications, and more particularly, to a method of transmitting a reception acknowledgement for a hybrid automatic repeat request (HARQ) in a time division duplex (TDD)-based wireless communication system and a user equipment using the method.

BACKGROUND ART

Long term evolution (LTE) based on 3rd generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

As a plurality of serving cells are introduced in the TDD system, a size of a payload of HARQ ACK/NACK is increased. It is important to increase transmission reliability of HARQ ACK/NACK to ensure reliability of performing HARQ. However, it is difficult to increase a data rate for user traffic if the payload of the HARQ ACK/NACK is excessively increased.

Accordingly, there is a need for a method capable of decreasing an increased payload of HARQ ACK/NACK while decreasing transmission reliability of HARQ ACK/NACK.

SUMMARY OF INVENTION

Technical Problem

The present invention provides a positive-acknowledgement (ACK)/negative-acknowledgement (NACK) transmission method and apparatus in a time division duplex (TDD)-based wireless communication system.

Technical Solution

According to an aspect of the present invention, a method of transmitting positive-acknowledgement (ACK)/negative-acknowledgement (NACK) of a user equipment in a time division duplex (TDD)-based wireless communication system in which M downlink subframes (where $M \geq 1$) are associated with an uplink subframe is provided. The method includes: receiving from a base station an uplink grant which includes an uplink resource assignment and an uplink downlink assignment index (DAI); receiving from the base station at least one downlink transport block in the M downlink subframes for each of a plurality of serving cells; determining an ACK/NACK payload size on the basis of a value of the uplink DAI; generating an ACK/NACK response for the at least one downlink transport block; multiplexing the ACK/NACK response on an uplink transport block; and transmitting to the base station the multiplexed ACK/NACK response by using the uplink resource assignment in the uplink subframe, wherein the ACK/NACK response is generated for a specific number of downlink transport blocks, where the specific number is equal to at least the ACK/NACK payload size.

In the aforementioned aspect of the present invention, the downlink transport block may include at least one of data and control information requiring the ACK/NACK response.

In addition, the uplink DAI may indicate a maximum value of the number of downlink subframes having at least one downlink transport block.

In addition, the at least one downlink transport block may be received on a physical downlink shared channel (PDSCH) having its corresponding physical downlink control channel (PDCCH) or on a PDSCH not having its corresponding PDCCH.

In addition, the at least one downlink transport block may further include a semi-persistent scheduling (SPS) release PDCCH indicating a release of semi-persistent scheduling.

In addition, the ACK/NACK response for the at least one downlink transport block may be generated by bundling ACK/NACK for a plurality of downlink transport blocks in each downlink subframe.

In addition, the ACK/NACK response for the at least one downlink transport block may be transmitted through a physical uplink shared channel (PUSCH) for transmitting at least one of uplink data and uplink control information.

In addition, if transmitted through a PUSCH, the ACK/NACK response for the at least one downlink transport block may be generated by bundling ACK/NACK for a plurality of downlink transport blocks in each of the downlink subframes irrespective of whether ACK/NACK bundling is performed in a physical uplink control channel (PUCCH) for transmitting only the uplink control information.

In addition, the ACK/NACK response for the at least one downlink transport block may be generated by bundling ACK/NACK for a plurality of downlink transport blocks in each of the downlink subframes only when only uplink control information such as downlink channel status information is transmitted through the PUSCH.

In addition, the ACK/NACK response for the at least one downlink transport block may be generated by being bundled in a unit of serving cell.

In addition, the downlink transport blocks may be transmitted on respective PDSCHs, and may be indicated by a downlink resource assignment in a downlink grant on PDCCHs corresponding to the PDSCHs. The downlink grant may include a DAI indicating an accumulative number of PDCCHs having assigned PDSCH transmission.

According to another aspect of the present invention, a user equipment for transmitting ACK/NACK in a TDD-based wireless communication system in which M downlink subframes (where $M\geq 1$) are associated with an uplink subframe is provided. The user equipment includes: a radio frequency (RF) unit for transmitting a radio signal; and a processor coupled to the RF unit, wherein the processor is configured for: receiving from a base station an uplink grant which includes an uplink resource assignment and an uplink DAI; receiving from the base station at least one downlink transport block in the M downlink subframes for a plurality of respective serving cells; determining an ACK/NACK payload size on the basis of a value of the uplink DAI; generating an ACK/NACK response for the at least one downlink transport block; multiplexing the ACK/NACK response on an uplink transport block; and transmitting to the base station the multiplexed ACK/NACK response by using the uplink resource assignment in the uplink subframe, wherein the ACK/NACK response is generated for a specific number of downlink transport blocks, where the specific number is equal to at least the ACK/NACK payload size.

Advantageous Effects

The present invention provides a method of transmitting a reception acknowledgement in a time division duplex (TDD) system supporting a plurality of serving cells. Therefore, a positive-acknowledgement (ACK)/negative-acknowledgement (NACK) mismatch between a base station and a user equipment can be decreased, and a size of an ACK/NACK payload can be decreased.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
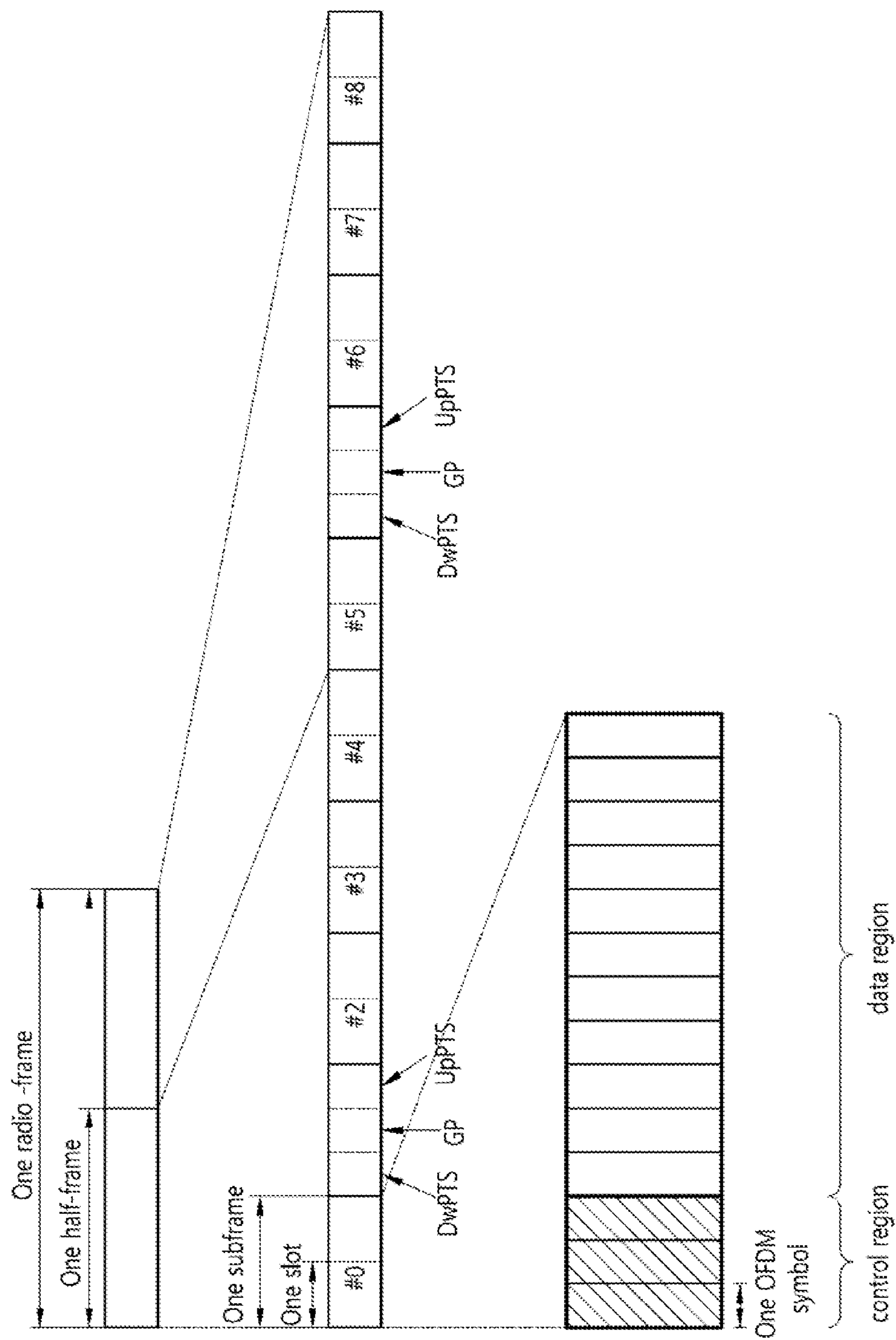
FIG. 1 shows a downlink radio frame structure in 3$^{rd}$ generation partnership project (3GPP) long term evolution (LTE).

FIG. 1 shows a downlink radio frame structure in 3$^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

In a radio frame used in TDD, a subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe coexist in one radio frame. Table 1 shows an example of a configuration of the radio frame.

TABLE 1

| UL-DL | Switch-point | Subframe index | | | | | | | | | |
|---|---|---|---|---|---|---|---|---|---|---|---|
| configuration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe,
'U' denotes a UL subframe, and
'S' denotes a special subframe.
When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
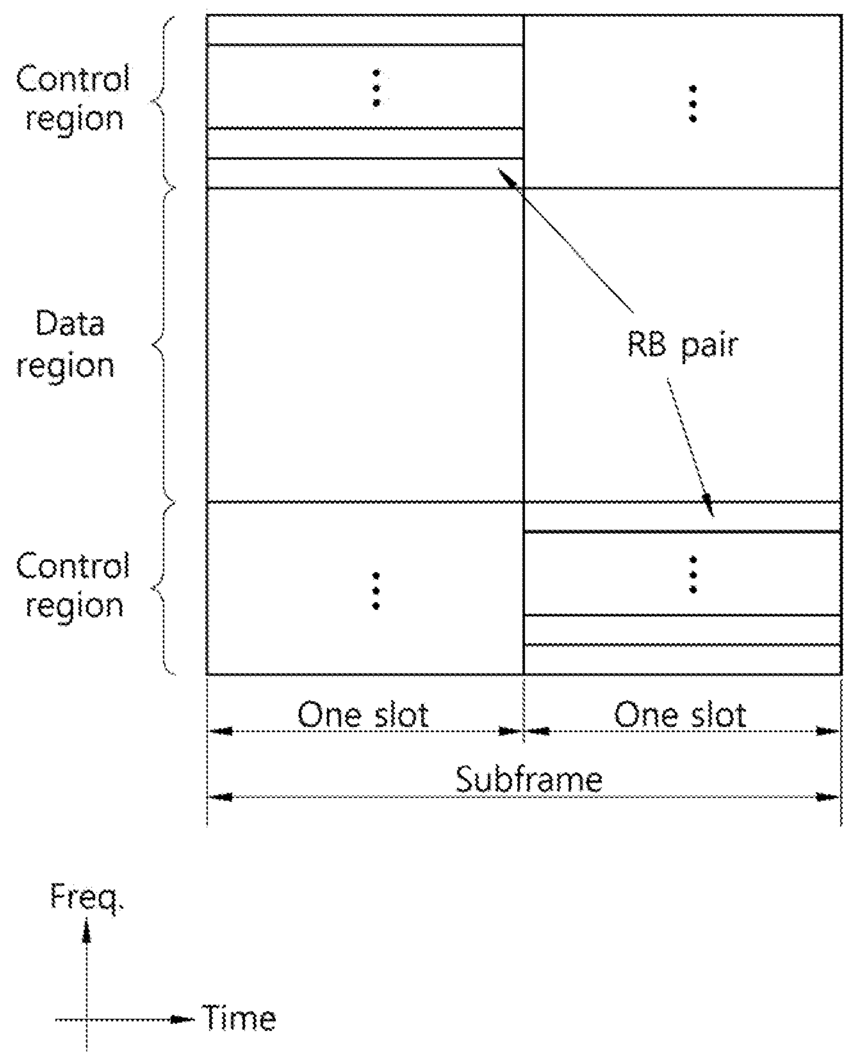
FIG. 2 shows an example of an uplink subframe in 3GPP LTE.

FIG. 2 shows an example of a UL subframe in 3GPP LTE.

The UL subframe can be divided into a control region and a data region in a frequency domain. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n)=e^{jb(n)\pi/4} \quad \text{[Equation 1]}$$

In Equation 1 above, u denotes a root index, and n denotes a component index in the range of $0 \le n \le N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined when a different root index is used.

The base sequence r(n) can be cyclically shifted by Equation 2 below to generate a cyclically shifted sequence $r(n, I_{cs})$.

$$r(n, I_{cs}) = r(n)\cdot\exp\left(\frac{j2\pi I_{cs} n}{N}\right),\quad 0 \le I_{cs} \le N-1 \quad \text{[Equation 2]}$$

In Equation 2 above, $I_{cs}$ denotes a CS index indicating a CS amount ($0 \le I_{cs} \le N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
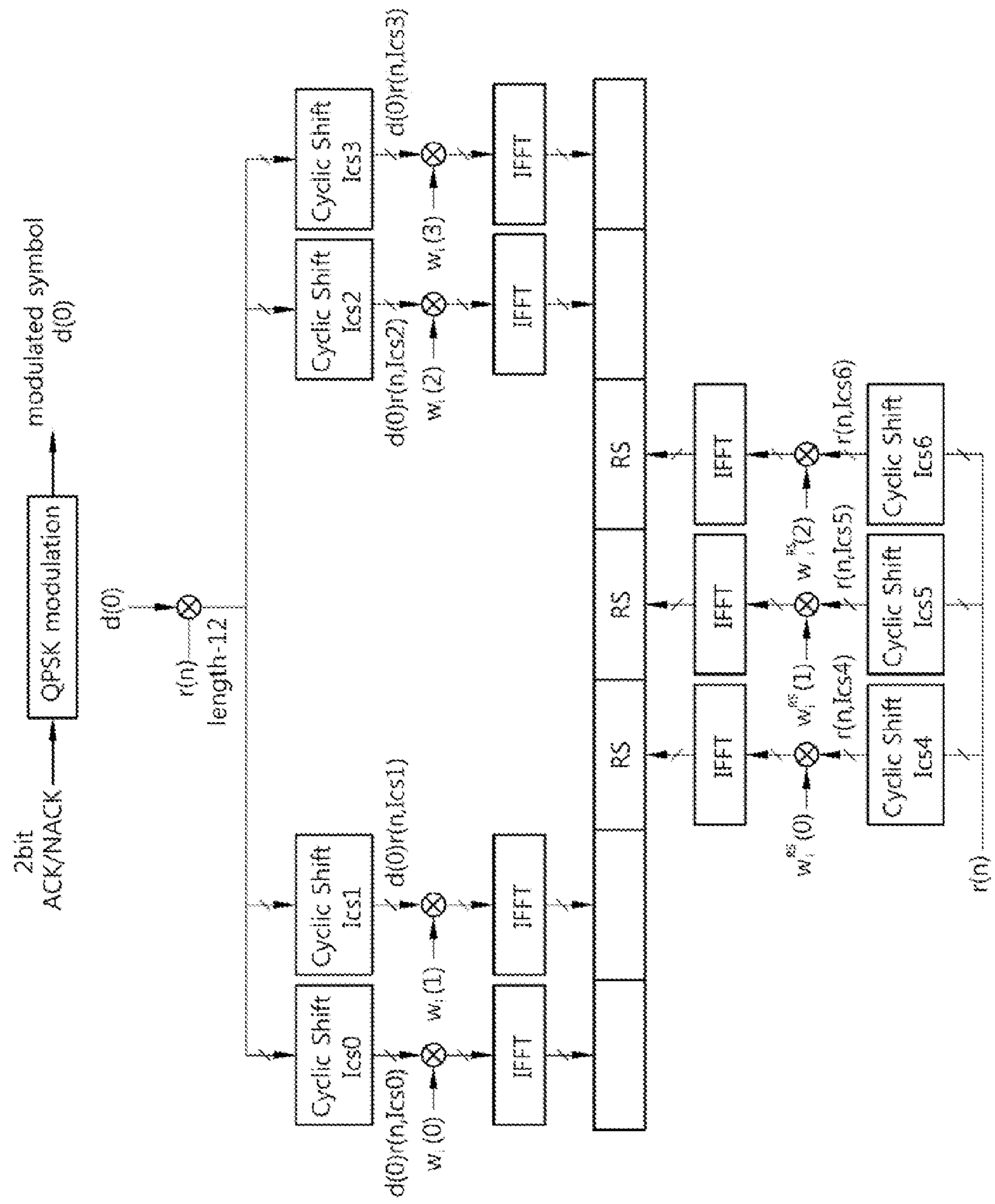
FIG. 3 shows a physical uplink control channel (PUCCH) format 1b in a normal cyclic prefix (CP) case in 3GPP LTE.

FIG. 3 shows a PUCCH format 1b in a normal CP case in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index 1 in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n,I_{cs})$. When a one-dimensionally spread sequence mapped to an $(i+1)^{th}$ OFDM symbol in a subframe is denoted by m(i), it can be expressed as follows.

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensionally spread sequence can be spread by using an orthogonal sequence. An orthogonal sequence $w_i(k)$ (where i is a sequence index, $0 \le k \le K-1$) having a spread factor K=4 uses the following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \le k \le K-1$) having a spread factor K=3 uses the following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, a two-dimensionally spread sequences {s(0), s(1), s(2), s(3)} can be expressed as follows.

$$\{s(0),s(1),s(2),s(3)\}=\{w_i(0)m(0),w_i(1)m(1),w_i(2)m(2),w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n, I_{cs4})$, $r(n,I_{cs5})$, and $r(n,I_{cs6})$ can be obtained. The three cyclically shifted sequences are spread by the use of an orthogonal sequence $w^{RS}{}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}{}_{PUCCH}$ is defined in order for the UE to obtain the three parameters for configuring the PUCCH. The resource index $n^{(1)}{}_{PUCCH}$ is defined to $n_{CCE}+N^{(1)}{}_{PUCCH}$, where $n_{CCE}$ is an index of a first CCE used for transmission of corresponding DCI (i.e., DL resource allocation used to receive DL data mapped to an ACK/NACK signal), and $N^{(1)}{}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
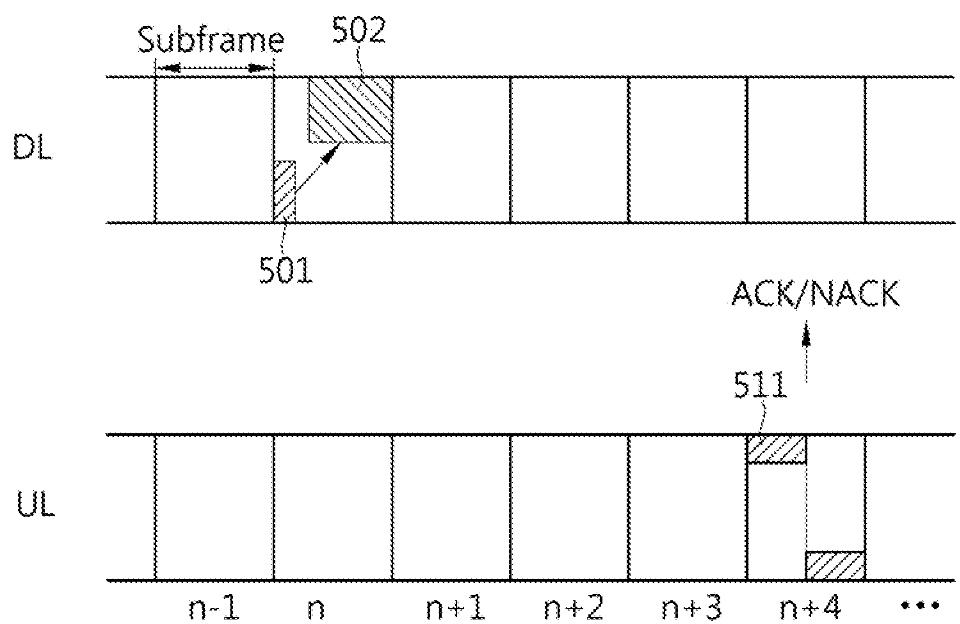
FIG. 4 shows an example of performing hybrid automatic repeat request (HARQ).

FIG. 4 shows an example of performing HARQ in frequency division duplex (FDD).

In the FDD, UL transmission and DL transmission are performed by using different frequencies.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for the DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUCCH}=n_{CCE}+N^{(1)}_{PUCCH}$.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through a plurality of DL CCs, it can be said that the UE receives a service from a plurality of serving cells. Hereinafter, the term “serving cell” and the DL CC are used without distinction for convenience of explanation. DL CCs different from each other may imply serving cells different from each other.

Figure 5:
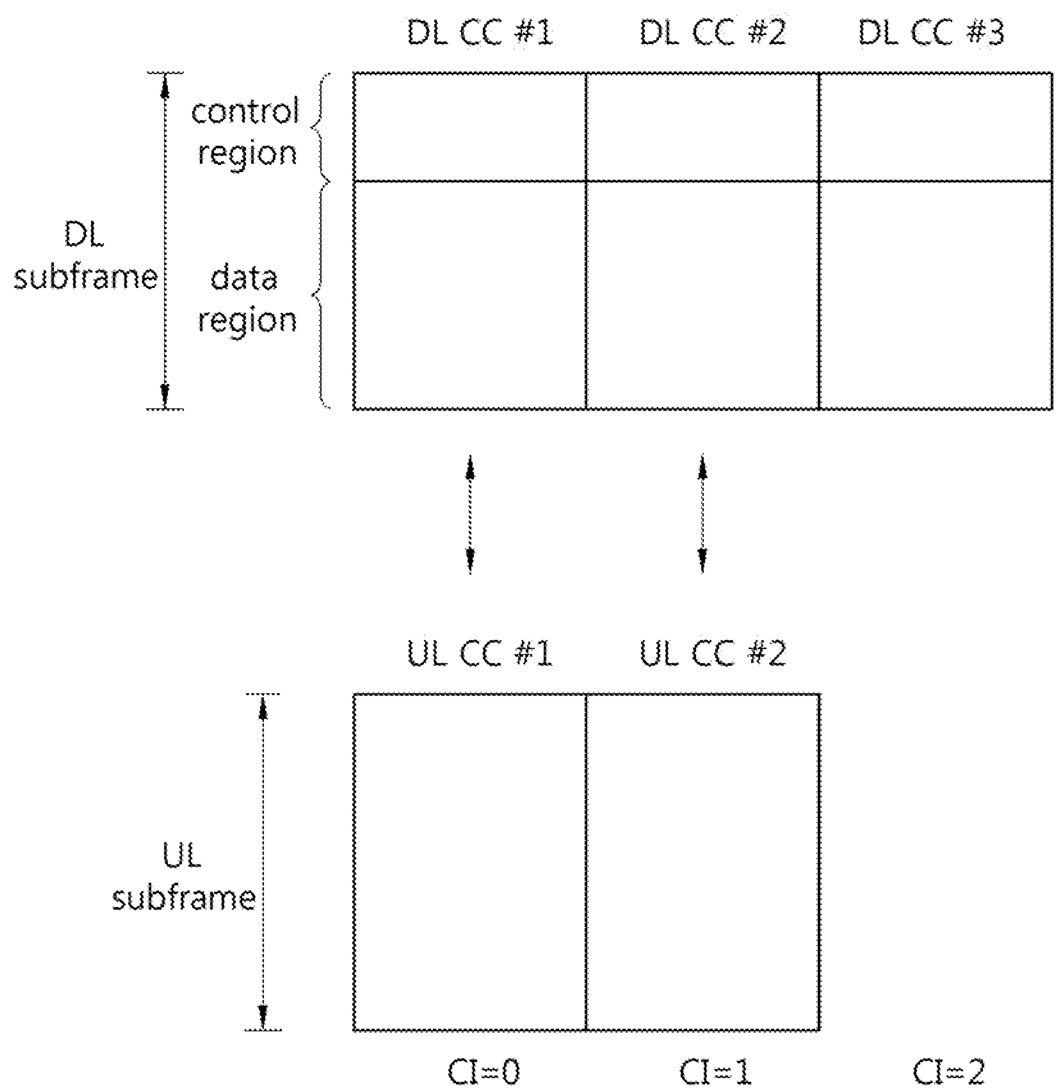
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

A CI of the primary cell may be fixed. For example, a lowest CI can be designated as the CI of the primary cell. It is assumed hereinafter that the CI of the primary cell is 0 and a CI of the secondary cell is allocated in an orderly manner starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n−k associated with a UL subframe n depending on the UL-DL configuration in 3GPP LTE. Herein, $k \in K$, where M is the number of elements of a set K. That is, M denotes the number of DL subframes associated with one UL subframe.

TABLE 5

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. An example of channel selection is shown in Table 6 below.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. In Table 6 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives three DL transport blocks in three DL subframes, the UE transmits bits (1,1) through the PUCCH by using $n^{(1)}_{PUCCH,2}$. If the UE fails to decode the DL transport block and successfully decodes the remaining transport blocks in a $1^{st}$ (i=0) DL subframe, the UE transmits bits (0, 1) through the PUCCH by using $n^{(1)}_{PUCCH,2}$.

In channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of the DL subframe (or PDCCH).

Assume that M=3, and the BS transmits three DL transport blocks via three DL subframes. The UE misses the PDCCH in the $2^{nd}$ DL subframe and thus cannot receive a $2^{nd}$ transport block at all, and can receive only the remaining $1^{st}$ and $3^{rd}$ transport blocks. In this case, if bundling is used, the UE erroneously transmits ACK.

In order to solve this error, a downlink assignment index (DAI) is included in a DL grant on the PDCCH. The DAI indicates an accumulative counter value of the PDCCH which transmits a PDSCH allocated thereto. A value of the 2-bit DAI is increased in an orderly manner starting from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Figure 6:
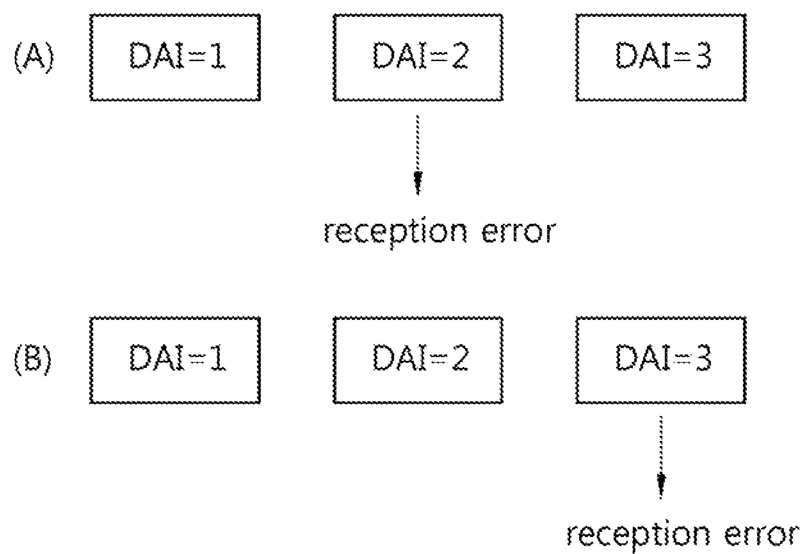
FIG. 6 shows examples of error detection using a downlink assignment index (DAI).

FIG. 6 shows examples of error detection using a DAI.

In FIG. 6A, a UE misses a $2^{nd}$ DL subframe, and thus cannot receive DAI=2. In this case, the UE receives DAI=3, and thus can know missing of a DL subframe corresponding to DAI=2.

In FIG. 6B, a UE misses a $3^{rd}$ DL subframe, and thus cannot receive DAI=3. In this case, the UE cannot know missing of the $3^{rd}$ DL subframe. However, in 3GPP LTE, a PUCCH is configured on the basis of a $1^{st}$ CCE of a last received PDCCH so that a BS is allowed to know missing of the DL subframe. That is, the UE transmits ACK/NACK by using a PUCCH resource based on a PUCCH resource of a DL subframe corresponding to DAI=2. The BS can know the missing of the $3^{rd}$ DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the conventional 3GPP LTE, in preparation for a case in which the number of ACK/NACK bits is insufficient.

Figure 7:
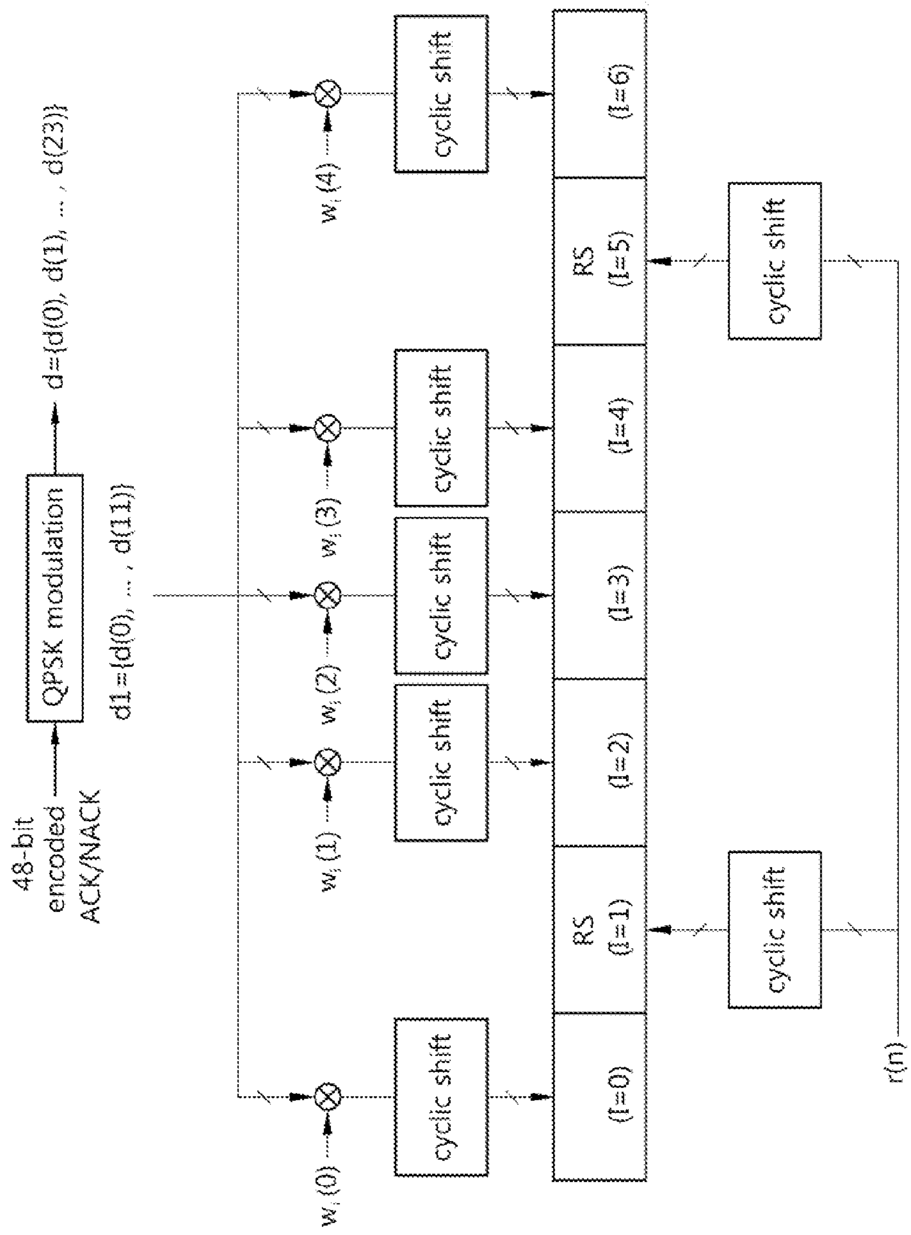
FIG. 7 shows an example of a structure of a physical uplink control channel (PUCCH) format 3 in a normal CP case.

FIG. 7 shows an example of a structure of a PUCCH format 3 in a normal CP case.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence d={1(0), d(1), . . . , d(23)} is generated by performing QPSK modulation on a 48-bit encoded ACK/NACK signal. d(n)(n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. It is shown in FIG. 7 that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 7 below can be selected in accordance with an orthogonal sequence index i.

TABLE 7

| Index (i) | $[w_i(0), w_i(1), w_i(2), w_i(3), w_i(4)]$ |
|---|---|
| 0 | [+1, +1, +1, +1, +1] |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the subframe can use different orthogonal sequence indices.

Each spread symbol sequence is cyclically shifted by a cell-specific CS value $n^{cell}_{cs}(n_s,1)$. Each cyclically shifted symbol sequence is transmitted by being mapped to a corresponding data OFDM symbol.

$n^{cell}_{ns}(n_s,1)$ is a cell-specific parameter determined by a pseudo-random sequence which is initialized on the basis of a physical cell identity (PCI). $n^{cell}_{cs}(n_s,1)$ varies depending on a slot number $n_s$ in a radio frame and an OFDM symbol number 1 in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

Now, semi-persistent scheduling (SPS) will be described.

In general, a UE first receives a DL grant on a PDCCH, and subsequently receives a transport block through a PDSCH indicated by the DL grant (such a PDSCH can be called a dynamic PDSCH). This implies that PDCCH monitoring is accompanied in every transport block, which is called dynamic scheduling.

The SPS may pre-define a PDSCH resource, and the UE may receive a transport block by using the pre-defined resource without PDCCH monitoring. Such a PDSCH may be called an SPS PDSCH.

Figure 8:
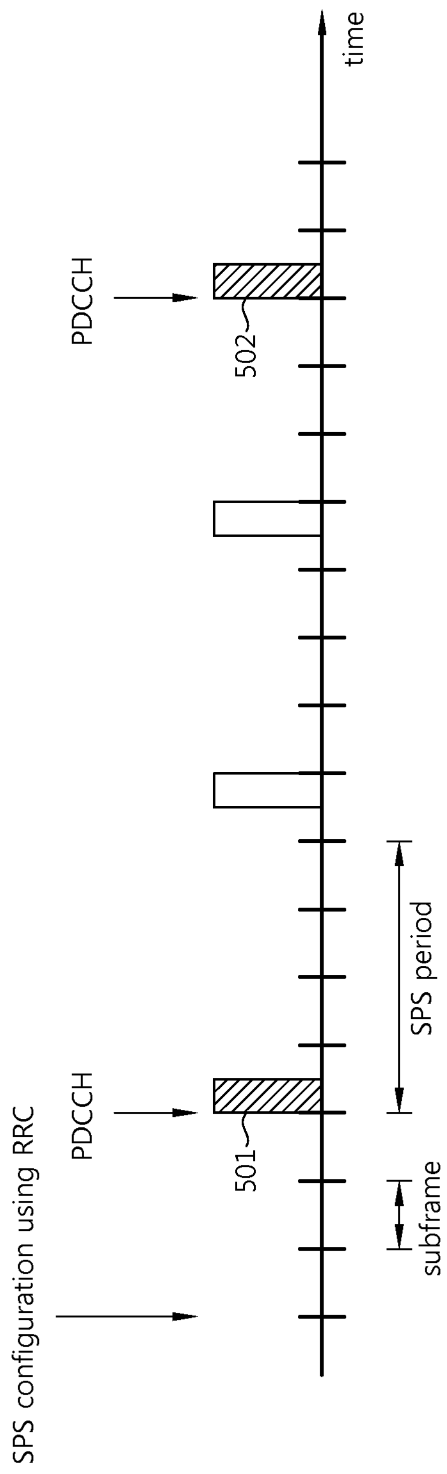
FIG. 8 shows an example of semi-persistent scheduling (SPS) in 3GPP LTE.

FIG. 8 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DMSR), a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period.

Thereafter, the UE monitors a PDCCH 502 in which a CRC is masked with the SPS-C-RNTI, and confirms deactivation of the SPS. The PDCCH for deactivating the SPS is called an SPS release PDCCH.

According to 3GPP LTE, the PDCCH indicating the activation of the SPS does not require an ACK/NACK response, but the SPS release PDCCH indicating the deactivation of the SPS requires the ACK/NACK response. Hereinafter, a DL transport block is used to collectively refer to any data which requires an ACK/NACK response. For example, the DL transport block may include not only a transport block (codeword) transmitted through a dynamic PDSCH and an SPS PDSCH but also an SPS release PDCCH indicating SPS deactivation.

Now, ACK/NACK transmission in a TDD system according to the present invention will be described. The present invention is applicable to a multiple carrier system.

An ACK/NACK state for HARQ is one of three states as follows.

ACK: When transmission of a transport block received on a PDSCH is successful.

NACK: When decoding of a transport block received on a PDSCH fails.

DTX: When reception on a transport block on a PDSCH fails, or in case of dynamic scheduling, when reception of a PDCCH fails.

As shown in Table 5, the M DL subframes are associated with the UL subframe n according to the UL-DL configuration. In this case, in order to express all of the three states in the UL subframe n, at least 2M bits are required for ACK/NACK transmission.

In order to express the ACK/NACK by using a smaller number of bits, an ACK/NACK multiplexing method may be considered as follows.

<ACK/NACK Bundling with PUCCH Format 3>

Figure 9:
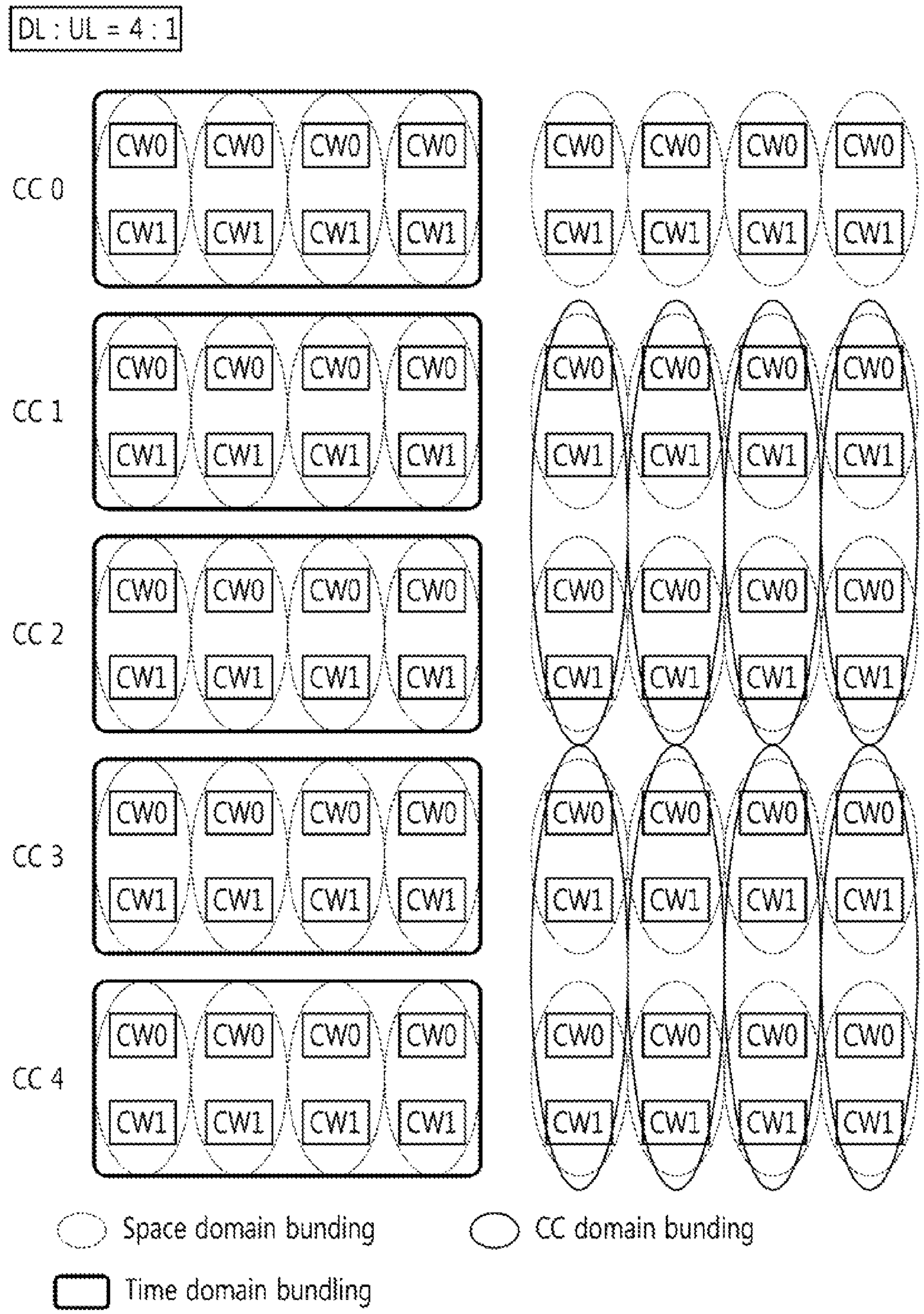
FIG. 9 shows examples of positive-acknowledgement (ACK)/negative-acknowledgement (NACK) bundling with a PUCCH format 3.

FIG. 9 shows examples of ACK/NACK bundling with a PUCCH format 3.

Referring to FIG. 9, five serving cells can be configured for a UE. DL CCs of the respective serving cells are denoted by a DL CC 0 to a DL CC 4. It is assumed that each serving cell can transmit up to two transport blocks (or codewords) in one subframe. It is also assumed that four DL subframes are associated with one UL subframe (i.e., M=4). If the five serving cells transmit two transport blocks (codewords) in one DL subframe, the UE must feed back ACK/NACK consisting of 40 bits (i.e., 5×4×2=40). A maximum amount of ACK/NACK information that can be transmitted using the PUCCH format 3 is 20 bits. Therefore, the UE performs bundling of ACK/NACK. Examples of the bundling include: 1) spatial bundling for performing bundling on a plurality of codewords which exist in one subframe; 2) CC domain bundling for performing bundling in a unit of serving cell; and 3) time domain bundling for performing bundling across a plurality of subframes in one serving cell. The UE can transmit the ACK/NACK information by compressing the information amount to an amount less than or equal to the maximum amount of the ACK/NACK information that can be transmitted using the PUCCH format 3 through the ACK/NACK bundling.

<Channel Selection Using PUCCH Format 1a/1b>

A UE may transmit ACK/NACK according to channel selection using the PUCCH format 1a/1b. The number of resources used in channel selection and the number of transmissible bits have the following relation.

1) In case of 2-bit channel selection, 2 PUCCH resources are used to transmit 2 bits. 2) In case of 3-bit channel selection, 3 PUCCH resources are used to transmit 3 bits. 3) In case of 4-bit channel selection, 4 PUCCH resources are used to transmit 4 bits. As such, it is assumed in the channel selection that up to 4 bits are transmitted, and thus if an ACK/NACK response for a specific number of codewords is required, where the specific number exceeds a number that can be expressed with 4 bits, an information amount of ACK/NACK to be transmitted is compressed by using at least one of spatial bundling, CC domain bundling, and time domain bundling. The following method can be used as a method of compressing the ACK/NACK information amount.

(1) Bundled ACK counter: A DL-downlink assignment index (DAI) in a PDCCH for transmitting a DL grant is used so that the ACK/NACK is set to "ACK/NACK=the number of ACKs (or 1)" if the number of received DAIs is equal to the number of ACKs, and otherwise, ACK/NACK=0. If an SPS PDSCH is present, ACK for this is included. For example, assume that the number of DAIs is 2, and one SPS PDSCH is present. In this case, if the total number of ACKs is 3, ACK/NACK=3.

(2) Consecutive ACK counter: ACK/NACK is set to "ACK/NACK=the number of ACKs corresponding to a DAI value which consecutively increases starting from a $1^{st}$ DAI value". For example, if reception of a PDSCH corresponding to a $1^{st}$ DAI fails, ACK/NACK=0. If reception of a PDSCH corresponding to 1st to 3rd DAIs is successful but reception of a PDSCH corresponding to a 4th DAI fails, ACK/NACK=3.

If ACK/NACK is 2 bits, a modulo-3 operation can be applied. If the ACK counter method is used and a TDD configuration with DL:UL=9:1 is considered, ACK/NACK can be expressed as follows.

If the number of ACKs (or NACK or DTX) is 0, ACK/NACK counter=0

If the number of ACKs is 1 or 4 or 7, ACK/NACK counter=1

If the number of ACKs is 2 or 5 or 8, ACK/NACK counter=2

If the number of ACKs is 3 or 6 or 9, ACK/NACK counter=3

The value of the ACK/NACK counter may be 0 for a case where: i) a DL grant PDCCH corresponding to a first DAI cannot be received in the absence of an SPS PDSCH; or ii) NACK is confirmed for a PDSCH corresponding to a first DAI, or NACK is confirmed for the SPS PDSCH in the absence of the SPS PDSCH.

Hereinafter, a method of transmitting ACK/NACK through a PUSCH in a piggyback manner will be described.

Figure 10:
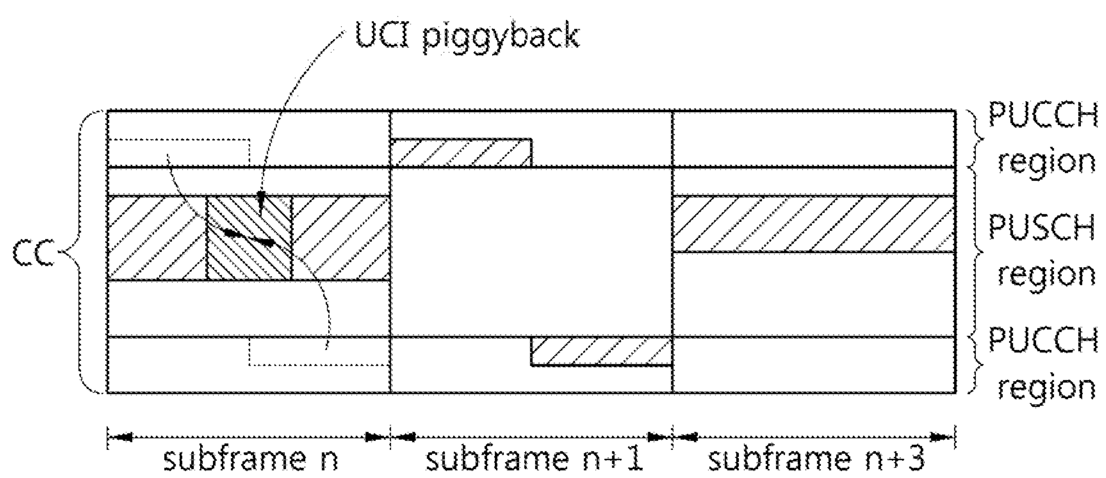
FIG. 10 shows an example of a subframe in which uplink control information (UCI) is transmitted in a piggyback (or multiplexing) manner.

FIG. 10 shows an example of a subframe in which uplink control information (UCI) is transmitted in a piggyback (or multiplexing) manner.

Referring to FIG. 10, in a subframe n, a UE does not transmit UCI via a PUCCH region but transmits it by multiplexing on UL data via a PUSCH region. That is, it is transmitted by being multiplexed on a UL transport block. On the other hand, the UCI is transmitted in a subframe n+1 via only the PUCCH region, and the UL data is transmitted in a subframe n+2 via only the PUSCH region. Similarly to the case of the subframe n, when the UCI is transmitted together with the data via the PUSCH region, it is called UCI piggyback transmission.

In 3GPP LTE Rel-8, in a UL case, single-carrier transmission is maintained to effectively utilize a power amplifier of a UE since the single-carrier transmission has a good peak-to-average power ratio (PAPR) property and a good cubic metric (CM) property which have an effect on performance of the power amplifier. In the 3GPP LTE Rel-8, in case of PUSCH transmission, the single-carrier property is maintained by performing discrete Fourier transform (DFT) spreading on data to be transmitted, and in case of PUCCH transmission, the single-carrier property is maintained by transmitting control information carried on a sequence having the single-carrier property. However, the single-carrier property is not maintained when the data subjected to the DFT spreading is allocated to non-consecutive subcarriers in a frequency domain or when a PUSCH and a PUCCH are simultaneously transmitted. Therefore, if the PUCCH and the PUSCH are predetermined to be transmitted simultaneously in the same subframe, the single-carrier property can be maintained by transmitting UCI to be transmitted through the PUCCH together with data through the PUSCH, that is, by performing transmission in a piggyback manner.

Figure 11:
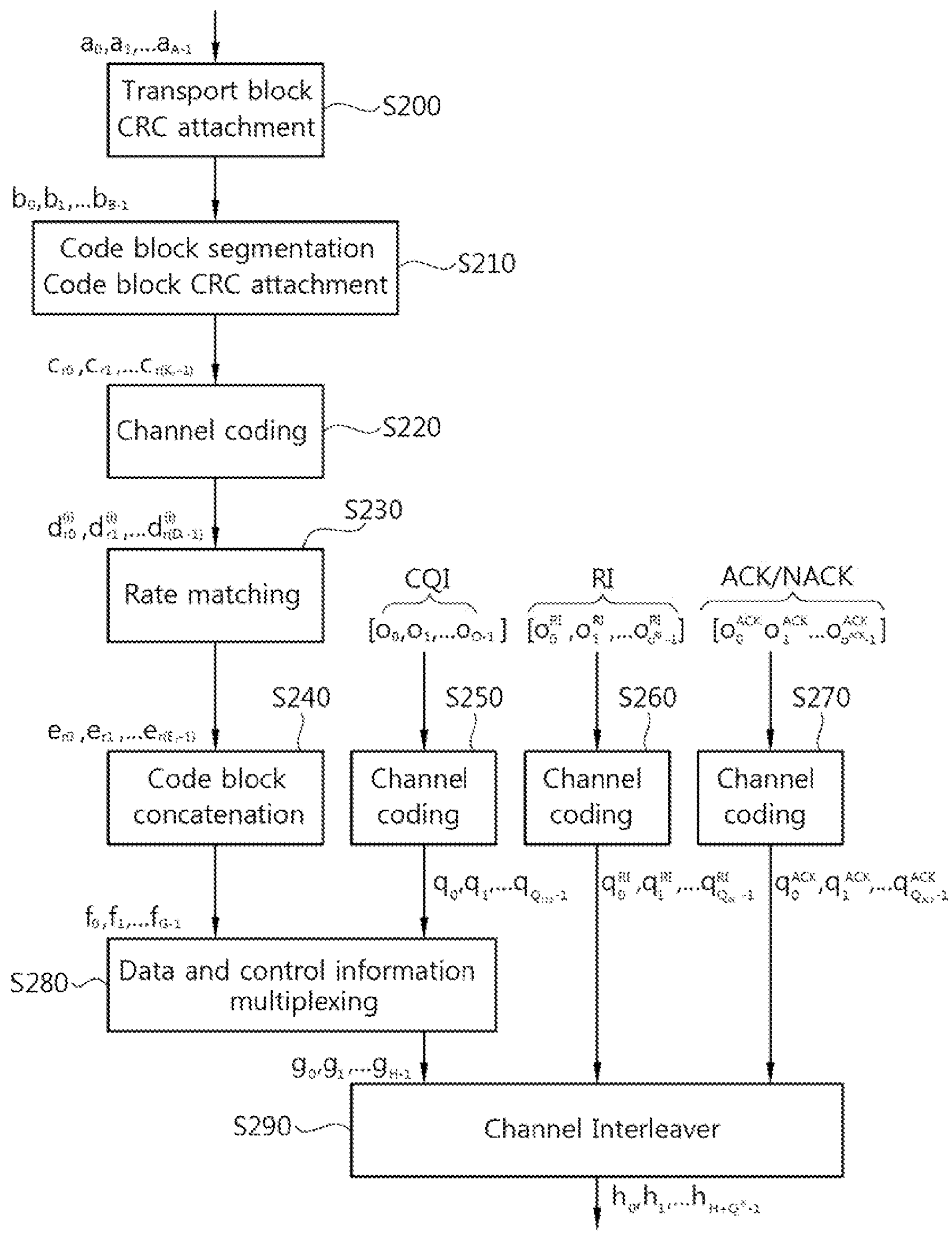
FIG. 11 shows a process of handling uplink data and UCI when the UCI is transmitted through a physical uplink shared channel (PUSCH) in a piggyback (or multiplexing) manner.

FIG. 11 shows a process of handling UL data and UCI when the UCI is transmitted through a PUSCH in a piggyback (or multiplexing) manner.

Referring to FIG. 11, data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B, A, and L are related as: B=A+L. Equation 3 below shows a relationship between $a_k$ and $b_k$.

$$b_k=a_k \text{ for } k=0, 1, \ldots, A-1$$

$$b_k=p_{k-A} \text{ for } k=A, A+1, \ldots, A+L-1 \qquad \text{[Equation 3]}$$

The CRC-attached bits $b_0, b_1, \ldots, b_{B-1}$ are segmented in a code block unit, and the CRC parity bits are re-attached in the code block unit (step 210). $c_{r0}, c_{r1}, \ldots, c_{r(Kr-1)}$ denote a bit sequence output after the code block segmentation. Herein, if a total number of code blocks is C, r denotes a code block number, and Kr denotes the number of bits for the code block number r.

Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Rate matching implies that an amount of data to be transmitted every transmission unit time, e.g., TTI, is adjusted to a maximum transmission amount of an actual channel. Herein, G denotes the total number of encoded bits used to transmit bits other than bits that are used in control information transmission when the control information is multiplexed on a PUSCH.

The control information (i.e., uplink control information) can be multiplexed together with data (i.e., uplink data). The data and the control information can use different coding rates by allocating a different number of coded symbols for transmission thereof. Examples of the control information include a channel quality indicator (CQI), a rank indicator (RI), an acknowledgement/not-acknowledgement (ACK/NACK), etc.

Channel coding is performed on CQI values $o_0, o_1, \ldots, o_{O-1}$ (where O is the number of CQI bits) to generate a control information bit sequence $q_0, q_1, \ldots, q_{QCQI-1}$ (step 250). Channel coding is performed on RI values $o_0^{RI}, o_1^{RI}, \ldots, o_{oRI-1}^{RI}$ to generate a control information bit sequence $q_0^{RI}, q_1^{RI}, \ldots, q_{QRI-1}^{RI}$ (step S260). Likewise, channel coding is performed on ACK/NACK values $o_0^{ACK}, o_1^{ACK}, \ldots, o_{oACK-1}^{ACK}$ to generate a control information bit sequence $q_0^{ACK}, q_1^{ACK}, \ldots, q_{QACK-1}^{ACK}$ (step S270).

A data bit sequence $f_0, f_1, \ldots, f_{G-1}$ is generated as described above and is multiplexed together with the control information bit sequence $q_0, q_1, \ldots, q_{QCQI-1}$ of the CQI into a multiplexed sequence $g_0, g_1, \ldots, g_{H-1}$ (step 280). In a process of multiplexing, the control information bit sequence $q_0, q_1, \ldots, q_{QCQI-1}$ of the CQI can be arranged first and thereafter the data bit sequence $f_0, f_1, \ldots, f_{G-1}$ can be arranged. That is, if H=G+Q, $[g_0, g_1, \ldots, g_{H-1}]$ may be configured such as $[q_0, q_1, \ldots, q_{QCQI-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ by a channel interleaver (step 280). In addition, the control information bit sequence of the RI or the ACK/NACK is mapped to modulation sequences $h_0, h_1, \ldots, h_{H'-1}$ by the channel interleaver. Herein, $h_i$ is a modulation symbol on a constellation, where $H'=H+Q_{RI}$. Each modulation symbol of the modulation sequence $h_0, h_1, \ldots, h_{H'-1}$ is mapped to a resource element for the PUSCH. The resource element is a subframe allocation unit defined with one SC-FDMA symbol (or OFDMA symbol) and one subcarrier.

Hereinafter, PUSCH piggyback transmission of ACK/NACK will be described according to an embodiment of the present invention.

Non-adaptive ACK/NACK transmission is a method of transmitting a fixed amount of an ACK/NACK payload. On the other hand, adaptive ACK/NACK transmission is a method of adaptively transmitting a PDSCH actually scheduled by using information such as an order of DAI or a total sum of DAI, a PDSCH actually scheduled by using information indicating the number of PDCCHs (e.g., SPS release PDCCHs) requiring ACK/NACK, and ACK/NACK for a PDCCH. Adaptive ACK/NACK transmission performed when ACK/NACK is transmitted through a PUSCH in a piggyback manner will be described.

A counter can be run by individually using a DAI field of a D1 grant for each DL CC. A DAI counter value may start from 0 or 1. It is assumed hereinafter that the DAI counter value starts from 1 for convenience of explanation.

Figure 12:
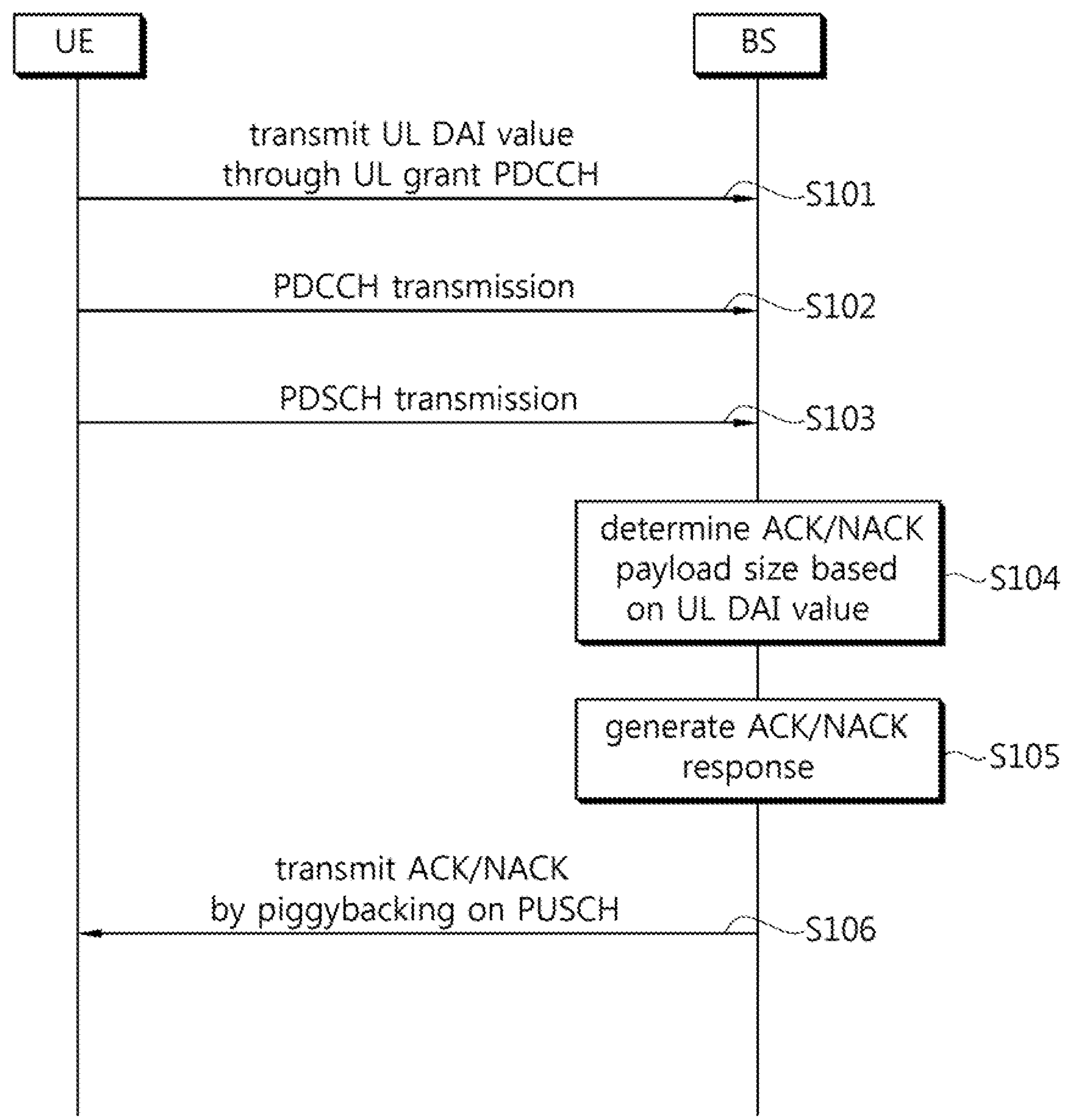
FIG. 12 shows an ACK/NACK feedback method of a user equipment according to an embodiment of the present invention.

FIG. 12 shows an ACK/NACK feedback method of a UE according to an embodiment of the present invention.

Referring to FIG. 12, a BS transmits a UL-DAI to the UE through a UL grant PDCCH (step S101). The UL grant PDCCH implies a PDCCH for scheduling a PUSCH, and may include a UL resource allocation and a UL-DAI. The UL grant PDCCH may use DCI formats 0 and 4.

For example, assume that the UL-DL configuration is set to 1 to 6 of Table 1 above, only one serving cell is configured, and a PUCCH format 3 is not used in the UE. In this case, the UE can receive a UL grant PDCCH in a subframe n−k'. The value k' is defined by Table 8 below.

TABLE 8

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

In Table 8 above, if the UL-DL configuration is 1 and a subframe number is set to n=2, then k'=6.

The UL DAI can indicate a maximum value of the total number of subframes having PDSCH transmission (including a PDSCH having its corresponding PDCCH and a PDSCH not having its corresponding PDCCH, e.g., an SPS PDSCH) and SPS release PDCCH transmission in each serving cell (for convenience, the maximum value is referred to as 'maxPDCCHperCC'). That is, the UL DAI may indicate a maximum value of the total number of DL subframes having at least one DL transport block in M DL subframes (see Table 5 above) associated with a UL subframe n for a plurality of serving cells.

The UL DAI can be transmitted by using a 2-bit field. Therefore, a modulo-4 operation can be applied to express a value exceeding a specific value. That is, if the value 'maxPDCCHperCC' has a value of {0, 1, 2, 3, 4, 5}, the UL DAI is given as {4, 1, 2, 3, 4, 1} in an orderly manner. When the UL DAI has a value of 4, the UE determines whether the SPS PDSCH is scheduled, whether a dynamic PDSCH based on the DL DAI value is scheduled, and whether an SPS release PDCCH is scheduled, and if it is determined that all of the SPS PDSCH, the dynamic PDSCH, and the SPS release PDCCH are not scheduled, the UE determines that the value 'maxPDCCHperCC' is 0. Otherwise, if it is determined that the SPS PDSCH, the dynamic PDSCH, and the SPS release PDCCH are scheduled, the UE determines that the value 'maxPDCCHperCC' is 4.

For example, if DL subframe: UL subframe=9:1 (that is, M=9), the value 'maxPDCCHperCC' may have a value such as {0, 1, 2, 3, 4, 5, 6, 7, 8, 9}. In this case, the UL DAI is given to {4, 1, 2, 3, 4, 1, 2, 3, 4, 1} in that order. If the UL DAI starts not from 1 but from 0, it can be given to {0, 1, 2, 3, 0, 1, 2, 3, 0, 1, 2}.

The BS transmits a PDCCH to the UE (step S102). Herein, the PDCCH implies at least one of an SPS release PDCCH and a DL grant PDCCH for scheduling a PDSCH.

The BS transmits the PDSCH (step S103). Herein, the PDSCH may be a dynamic PDSCH having its corresponding PDCCH or may be an SPS PDSCH not having its corresponding PDCCH.

The UE determines an ACK/NACK payload size on the basis of the UL DAI value (step S104). The ACK/NACK payload size may imply the number of DL transport blocks for which ACK/NACK is transmitted. The UE determines the ACK/NACK payload size on the basis of 'maxPDCCHperCC' indicated by the UL DAI value. The conventional technique determines the ACK/NACK payload size on the basis of the number of DL subframes associated with a UL subframe, that is, on the basis of a value M, whereas the present invention determines the ACK/NACK payload size on the basis of the UL DAI value.

Figure 13:
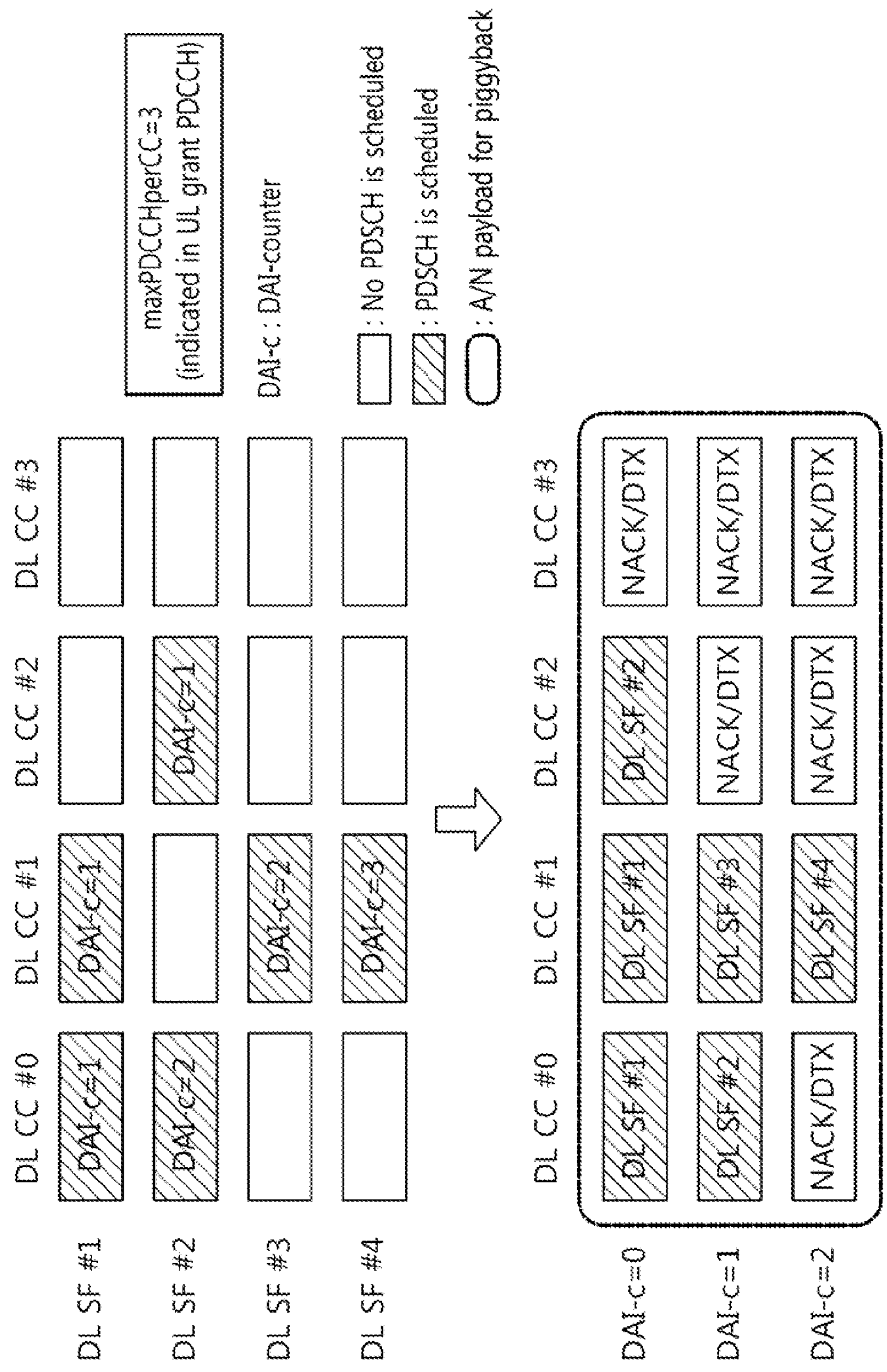
FIG. 13 shows an example of determining an ACK/NACK payload size of a user equipment.

FIG. 13 shows an example of determining an ACK/NACK payload size of a UE.

Referring to FIG. 13, four serving cells are configured for the UE. DL CCs included in the respective serving cells are denoted by a DL CC #0, a DL CC #1, a DL CC #2, and a DL CC #3. In each DL CC, four DL subframes are associated with one UL subframe. That is, M=4.

In this case, the conventional technique determines the ACK/NACK payload size according to M=4, the number of configured serving cells (i.e., 4), and the maximum number of codewords on the basis of a transmission mode of each serving cell. That is, if a transmission mode of each serving cell is a MIMO mode capable of transmitting two codewords in the example above, the ACK/NACK payload size is determined to 32 bits (i.e., 4×4×2=32).

On the other hand, the present invention determines the ACK/NACK payload size on the basis of a UL DAI value, i.e., a maximum value 'maxPDCCHperCC' of the number of PDSCHs actually transmitted in each serving cell. Referring to FIG. 13, in practice, two PDSCHs are transmitted in the DL CC #0, three PDSCHs are transmitted in the DL CC #1, one PDSCH is transmitted in the DL CC #2, and no PDSCH is transmitted in the DL CC #3. In this case, the BS transmits '3' as the UL DAI value. Then, the UE determines the ACK/NACK payload size on the basis of the number of serving cells, the transmission mode of each serving cell, and the UL DAI value. In the example above, the number of serving cells is 4, up to two codewords can be transmitted in each serving cell, and the UL DAI value is 3. Thus, the ACK/NACK payload size is 24 bits (i.e., 4×2×3=24). Accordingly, the ACK/NACK payload size is decreased in comparison with the conventional technique.

Referring back to FIG. 12, the UE generates an ACK/NACK response (step S105). The UE generates ACK/NACK only for a PDSCH corresponding to a DL-DAI for 'maxPDCCHperCC'=3. If the PDSCH corresponding to the DL-DAI is not received, DTX or NACK is used as a response thereof. An ACK/NACK bit constituting the ACK/NACK payload may be determined, not according to the number of codewords instantaneously transmitted to avoid misalignment between the BS and the UE with respect to the number/location of ACK/NACK bits, but according to a transmission mode of each DL CC, that is, the maximum number of transmissible codewords and a presence/absence of codeword bundling.

The UE transmits the generated ACK/NACK response to the BS by piggybacking it on a PUSCH (step S106). The generated ACK/NACK response can be transmitted through a bundling process to be described below. That is, the UE transmits the ACK/NACK response generated according to the ACK/NACK payload size, if required, by performing bundling. In this case, an actually transmitted ACK/NACK information bit may be decreased in comparison with the ACK/NACK payload size.

Hereinafter, a bundling method will be described when ACK/NACK is transmitted in a piggyback manner through a PUSCH.

1. Method of Equally Applying Bundling Applied to PUCCH

For example, if ACK/NACK is transmitted through a PUCCH, the maximum number of ACK/NACK bits that can be transmitted according to a PUCCH format can be considered. Assume that the maximum number of transmissible ACK/NACK bits is defined as X. If the number of ACK/NACK bits that must be actually transmitted through the PUCCH exceeds the X bits, spatial bundling is applied. In this case, a bundling method used when the ACK/NACK is transmitted through the PUCCH can be equally applied to a case where the ACK/NACK is transmitted in a piggyback manner through a PUSCH. For example, if it is configured such that spatial bundling is not applied to the DL CC #0 and the DL CC #1 and is applied to the DL CC #2 and the DL CC #3 when the ACK/NACK is transmitted through the PUCCH, spatial bundling may be not applied to the DL CC #0 and the DL CC #1 and may be applied to the DL CC #2 and the DL CC #3 when the ACK/NACK is transmitted by being piggybacked on the PUSCH.

If the number of ACK/NACK information bits transmitted through the PUSCH is denoted by $O_{HARQ-ACK}$, it can be determined by Equation 4 below. It is assumed herein that the maximum number of transport blocks that can be received for each serving cell is 1 or 2.

$$O_{HARQ-ACK} = \max PDCCHperCC \cdot \sum_{c=0}^{C-1} TB_{max,bundlingDecision}(c) \quad \text{[Equation 4]}$$

In Equation 4 above, C denotes the number of serving cells assigned to be aggregated to the UE, and $TB_{max,bundlingDecision}(c)$ denotes the maximum number of ACK/NACKs that must be transmitted after determining whether to apply spatial bundling in one subframe for a serving cell c. In addition, as described above, 'maxPDCCHperCC' denotes a maximum value of total sums of a dynamic PDSCH, an SPS PDSCH, and an SPS release PDCCH for each serving cell. 'maxPDCCHperCC' may be determined by the aforementioned UL-DAI.

If the maximum number of transport blocks that can be received in one subframe is 2, $TB_{max,bundlingDecision}(c)=2$ for a serving cell to which spatial bundling is not applied, and $TB_{max,bundlingDecision}(c)=1$ for a serving cell to which spatial bundling is applied. If the maximum number of transport blocks that can be received in one subframe is 1, $TB_{max,bundlingDecision}(c)=1$ since whether to apply spatial bundling does not exist.

This can be summarized by Equation 5 below.

$$O_{HARQ-ACK} = \max PDCCHperCC \cdot \sum_{c=0}^{C-1} TB_{max,bundlingDecision}(c) = \max PDCCHperCC \cdot (C + C_2) \quad \text{[Equation 5]}$$

In Equation 5 above, $C_2$ denotes the number of serving cells configured to transmit up to two ACK/NACKs after determining whether to apply spatial bundling. That is, $C_2$ denotes the number of serving cells configured not to apply spatial bundling among serving cells configured to transmit up to two transport blocks.

The aforementioned equation can be summarized by an equation in which a UL-DAI is directly included. In this case, DL subframe: UL subframe=4:1, a 2-bit UL-DAI is used, and 'maxPDCCHperCC' is signaled by applying a modulo-4 operation.

$$O_{HARQ-ACK} = \begin{cases} 0 & \text{if } V_{DAI}^{UL} = 4 \text{ and a } UE \text{ determines that a } PDSCH \text{ or an } SPS \text{ release } PDCCH \text{ is not present on the basis of } SPS \text{ scheduling and } DL\text{-}DAI \\ V_{DAI}^{UL} \cdot \sum_{c=0}^{C-1} TB_{max,bundlingDecision}(c) = V_{DAI}^{UL} \cdot (C + C_2), & \text{otherwise} \end{cases} \quad \text{[Equation 6]}$$

In Equation 6 above, $V_{DAI}^{UL}=4$ denotes UL-DAI.

2. Method of Applying Bundling Independently of Bundling Applied to PUCCH

In this method, bundling is applied independently of bundling used in ACK/NACK transmission of a PUCCH when ACK/NACK is transmitted in a piggyback manner through a PUSCH.

For example, when the maximum number of transmission bits of ACK/NACK that can be transmitted in a piggyback manner through a PUSCH is Y bits, an ACK/NACK payload size is determined according to a value 'maxPDCCHperCC' determined by a UL-DAI value, the number of configured serving cells, and a transmission mode of each serving cell, and then an ACK/NACK bit is generated. In addition, if the generated ACK/NACK bit exceeds the Y bits, spatial bundling is applied, and otherwise if not exceeding the Y bits, the spatial bundling is not applied. The Y bits can be set to be equal to the aforementioned X bits (i.e., the maximum ACK/NACK bit that can be transmitted on a PUCCH).

Figure 14:
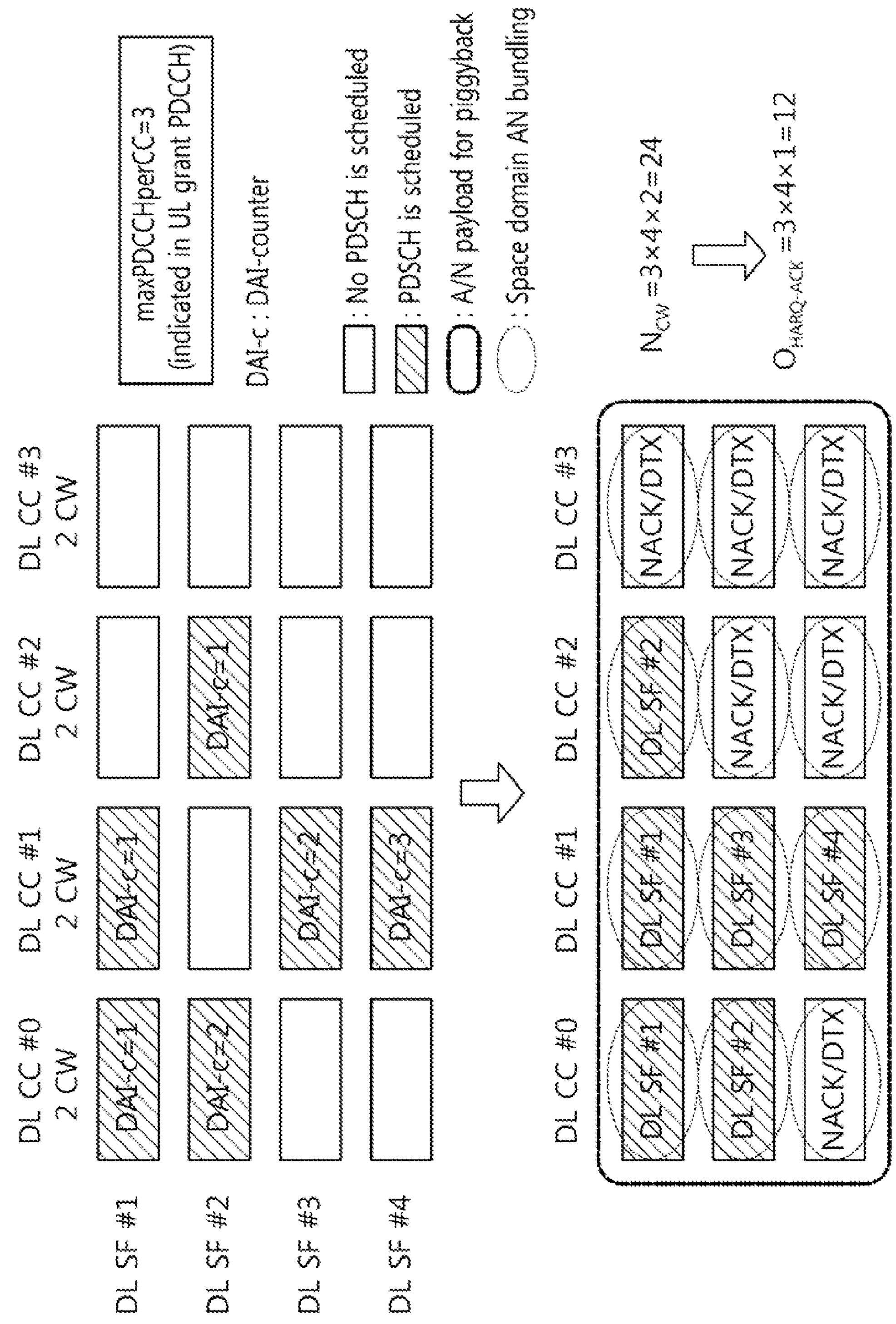
FIG. 14 shows a first bundling method that can be applied when ACK/NACK is transmitted in PUSCH piggyback transmission.

FIG. 14 shows a first bundling method that can be applied when ACK/NACK is transmitted in PUSCH piggyback transmission.

Referring to FIG. 14, a value 'maxPDCCHperCC' is 3, the number of configured serving cells is 4, and up to two codewords can be transmitted in each serving cell. In this case, a UE determines an ACK/NACK payload size to 24 bits (i.e., 3×4×2=24). The maximum number of ACK/NACK bits that can be transmitted in a piggyback manner through a PUSCH can be set to be equal to X, i.e., the maximum number of bits of ACK/NACK that can be transmitted using a PUCCH format 3. Then, Y=20 bits. In this case, bundling is applied since the number of transmissible bits, i.e., Y, is 20 bits, and the ACK/NACK payload size is 24 bits.

The UE can apply the spatial bundling for all serving cells. Then, since one ACK/NACK is generated for two codewords transmitted in each subframe of each serving cell, an ACK/NACK information amount can be decreased to 12 bits in total.

Figure 15:
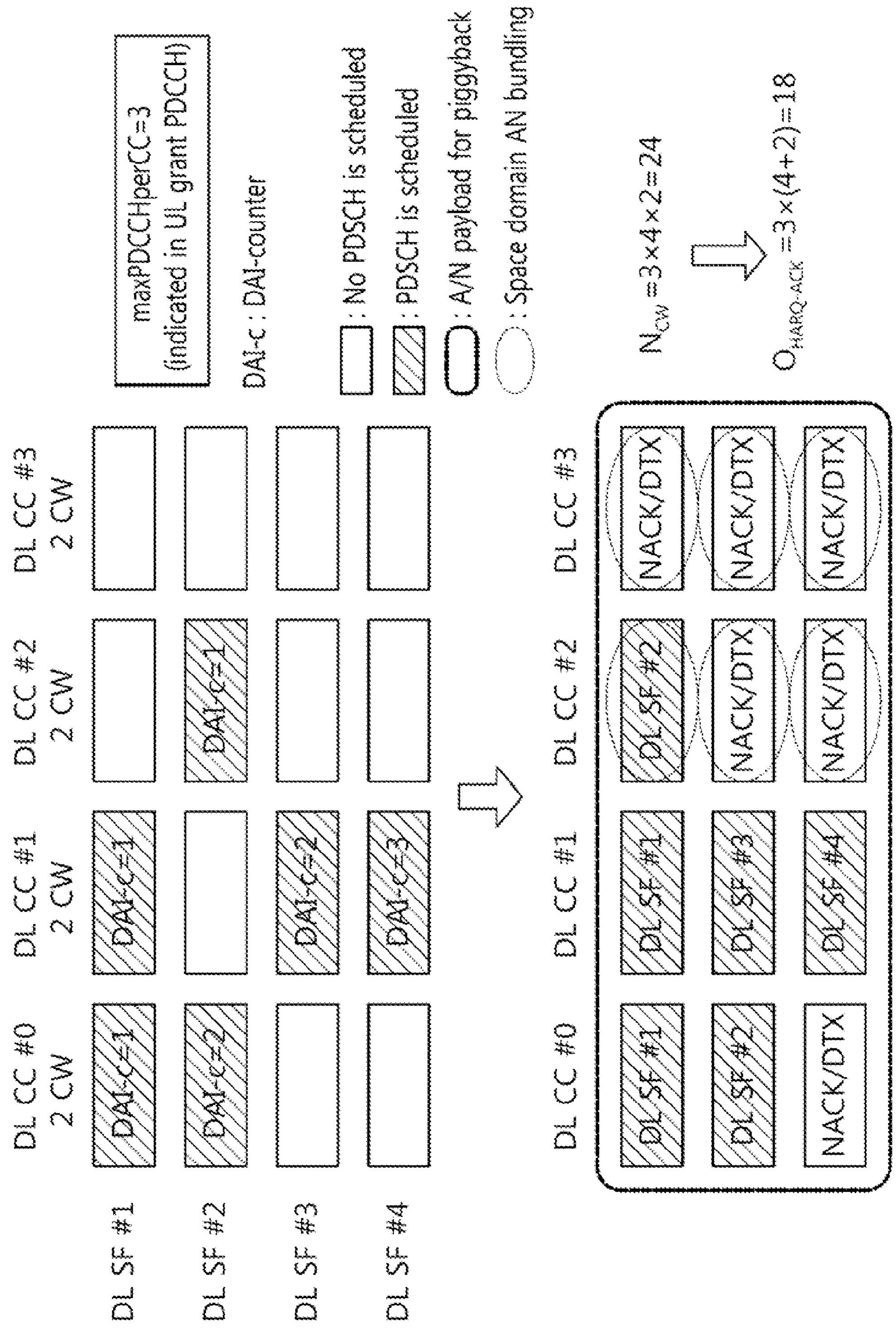
FIG. 15 shows a second bundling method that can be applied when ACK/NACK is transmitted in PUSCH piggyback transmission.

FIG. 15 shows a second bundling method that can be applied when ACK/NACK is transmitted in PUSCH piggyback transmission.

Referring to FIG. 15, in the same situation as FIG. 14, a UE gradually applies spatial bundling to some serving cells instead of equally applying the spatial bundling to all serving cells. For example, the UE applies the spatial bundling first to a DL CC #3 of a serving cell #3. As a result, an amount of ACK/NACK information to be transmitted exceeds Y bits, and thus the spatial bundling is applied to a DL CC #2 of a serving cell #2. The spatial bundling is gradually applied for each serving cell in this manner, and if an ACK/NACK information amount derived as a result thereof is less than or equal to Y bits, the spatial bundling is no longer performed.

In the example of FIG. 15, the number of bits required as the amount of ACK/NACK information to be transmitted is 12 bits for DL CCs#0 and #1 and 6 bits for DL CCs #2 and #3. As a result, the total amount of ACK/NACK information to be transmitted is 18 bits.

Figure 16:
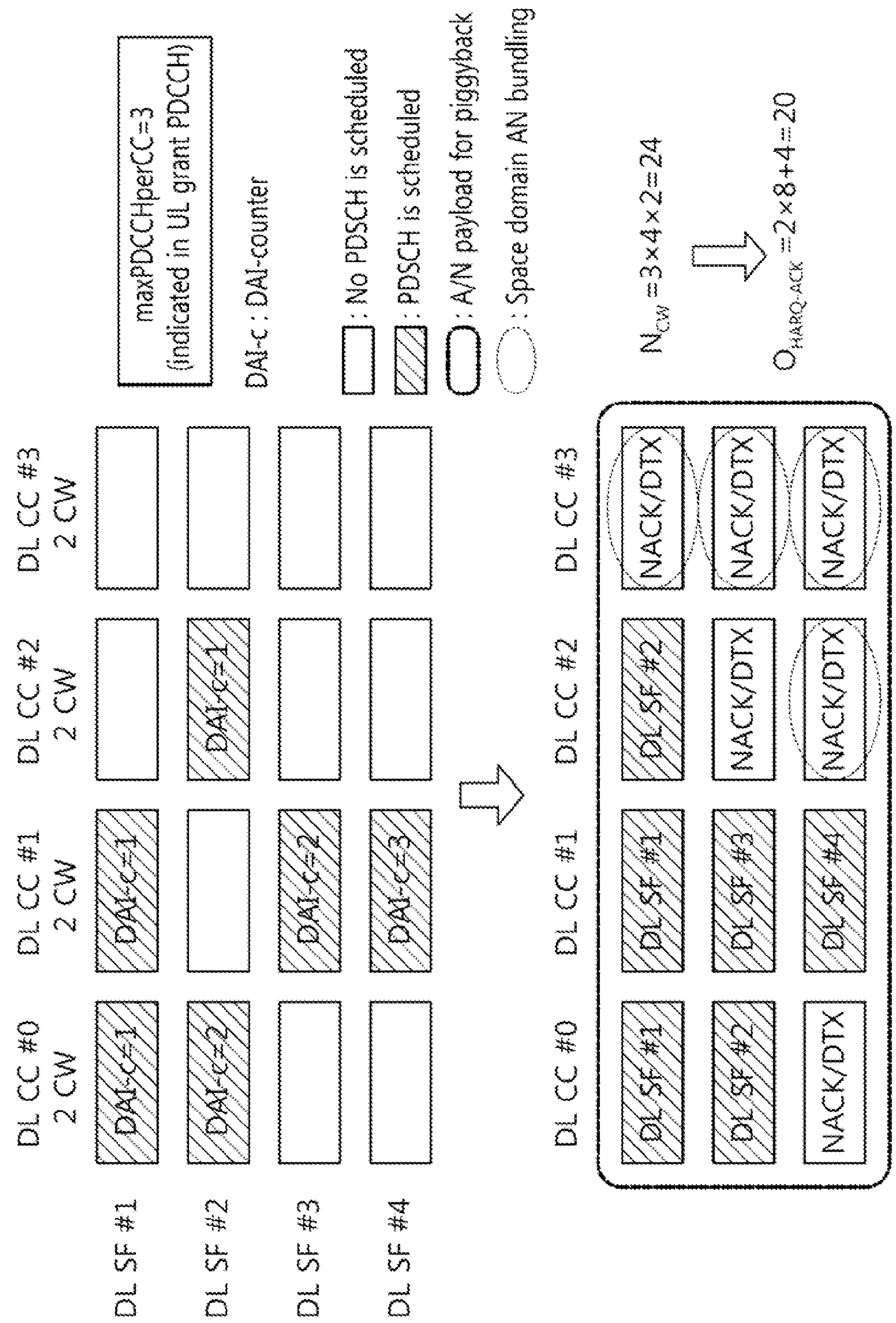
FIG. 16 shows a third bundling method that can be applied when ACK/NACK is transmitted in PUSCH piggyback transmission.

FIG. 16 shows a third bundling method that can be applied when ACK/NACK is transmitted in PUSCH piggyback transmission.

Referring to FIG. 16, in the same situation as FIG. 14, a UE applies spatial bundling in a subframe unit of a serving cell. That is, the UE gradually applies the spatial bundling in the subframe unit for some serving cells among configured serving cells.

For example, the UE gradually applies the spatial bundling in the subframe unit in a DL CC #3 of a serving cell #3. As a result, an amount of ACK/NACK information to be transmitted exceeds Y bits, and thus the spatial bundling is gradually applied to a DL CC #2 of a serving cell #2 in the subframe unit. Unlink the case of FIG. 15 in which the spatial bundling is applied to all subframes of the DL CC #2, FIG. 16 shows a case in which spatial bundling is applied to some subframes of the DL CC #2 and if an amount of ACK/NACK information to be transmitted is less than or equal to Y bits as a result thereof, the spatial bundling is no longer performed.

In the example of FIG. 16, the number of bits required as the amount of ACK/NACK information to be transmitted is 12 bits for DL CCs #0 and #1, 5 bits for a DL CC #2, and 3 bits for a DL CC #3. As a result, the total amount of ACK/NACK to be transmitted is 20 bits.

Meanwhile, as a fourth bundling method, there is a method of always performing bundling when ACK/NACK is transmitted through a PUSCH irrespective of whether ACK/NACK bundling is applied when transmitted through a PUCCH. For example, when the ACK/NACK is transmitted through the PUSCH, only the spatial bundling is always applied or the spatial bundling and time bundling are always applied. In this method, the number of bits used to transmit the ACK/NACK is decreased when the ACK/NACK is transmitted simultaneously with UL data or uplink control information (e.g., CSI) excluding the ACK/NACK through the PUSCH. Therefore, it is possible to prevent transmit power shortage which may occur when data (or CSI information) and not-bundled ACK/NACK are simultaneously transmitted through the PUSCH. As a result, advantageously, this method prevents a decrease of a cell coverage. In particular, the forth bundling method may be applied only when only CSI including ACK/NACK without UL data (i.e., UL-SCH) is transmitted through the PUSCH. That is, an amount of puncturing the CSI is decreased based on ACK/NACK transmission, thereby being able to decrease reception performance deterioration of the CSI.

The aforementioned first bundling method has an advantage in that it can be easily implemented since spatial bundling can be simply applied. The third bundling method has an advantage in that individual ACK/NACK of each codeword can be transmitted as much as possible by utilizing transmissible bits to the maximum extent possible. The second bundling method has an intermediary characteristic between the first bundling method and the third bundling method. The fourth bundling method has a characteristic in that a cell coverage is maintained to the maximum extent possible while giving up individual ACK/NACK transmission.

If PUSCH transmission exists at a time when a PUCCH is transmitted, ACK/NACK may be piggybacked on the PUSCH. In this case, a method of transmitting the ACK/NACK to be piggybacked on the PUSCH may differ depending on a method of transmitting the ACK/NACK through the PUCCH.

<When Using PUCCH Format 3 in PUCCH Transmission>

1. ACK/NACK may be piggybacked on a PUSCH directly in a bundled state. ACK/NACK bundling may be applied because of not only a limitation of the number of transmissible bits based on a PUCCH format but also shortage of transmit power. If the ACK/NACK bundling is achieved in the PUCCH format 3 due to the shortage of transmit power, it is not desirable for reliable ACK/NACK transmission to perform individual ACK/NACK transmission without performing ACK/NACK bundling. Therefore, bundling to be used in the PUCCH format 3 is maintained equally when the ACK/NACK is transmitted in a piggyback manner through the PUSCH.

2. ACK/NACK bundling may be canceled, and individual ACK/NACK may be transmitted for each codeword, each serving cell, and each subframe through a PUSCH. As described above, the ACK/NACK bundling can be applied according to a limitation on the number of transmissible bits based on a PUCCH format or a limitation on transmit power. If the ACK/NACK bundling is performed according to the limitation on the number of transmissible bits of the PUCCH format, it is not necessary to perform the ACK/NACK bundling when ACK/NACK is transmitted in a piggyback manner through the PUSCH. Therefore, the ACK/NACK bundling is canceled and individual ACK/NACK is transmitted when the ACK/NACK is transmitted in a piggyback manner through the PUSCH. Accordingly, unnecessary retransmission can be avoided, and data throughput can be increased.

3. ACK/NACK bundling may be always applied to decrease a cell coverage of a PUSCH including ACK/NACK transmission. That is, by decreasing the number of resource elements (REs) required for ACK/NACK transmission, an RE puncturing amount of data traffic or CSI can be decreased, thereby being able to decrease deterioration of reception performance of the data traffic or the CSI.

<When Using Channel Selection in PUCCH Transmission>

If channel selection is used when ACK/NACK is transmitted through a PUCCH, it is possible to use a method in which: A) the ACK/NACK can be transmitted directly in a bundled state when the ACK/NACK is transmitted in a piggyback manner through the PUSCH; or B) ACK/NACK bundling can be canceled and individual ACK/NACK for each codeword, each serving cell, and each subframe can be transmitted in a piggyback manner through the PUSCH; or C) ACK/NACK bundling can be always applied so that bundled ACK/NACK is transmitted in a piggyback manner through the PUSCH. Which method will be used among the methods A, B, and C can be signaled by using a physical layer signal or can be signaled by using a higher layer signal such as RRC.

Figure 17:
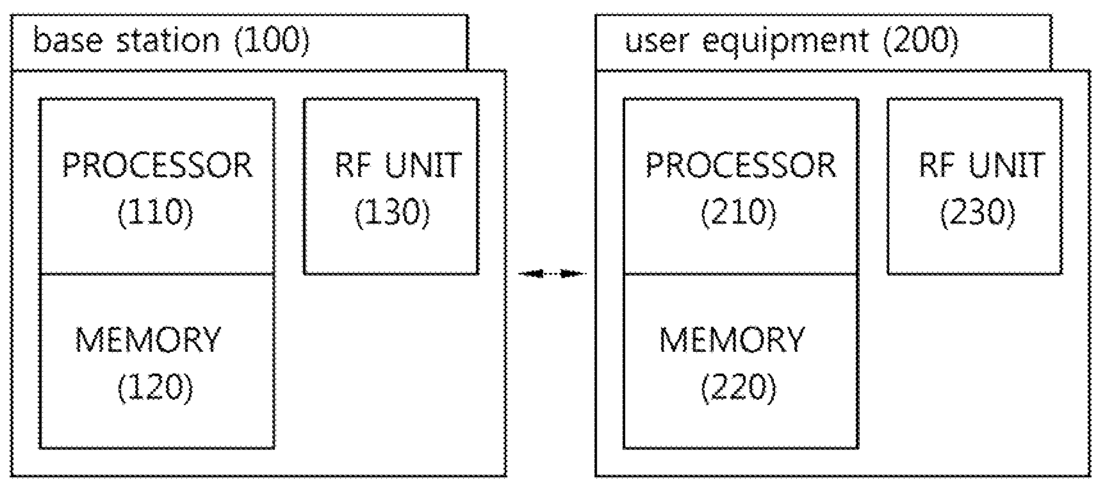
FIG. 17 is a block diagram showing a wireless device for implementing an embodiment of the present invention.

FIG. 17 is a block diagram showing a wireless device for implementing an embodiment of the present invention.

A BS 100 includes a processor 110, a memory 120, and a radio frequency (RF) unit 130. The processor 110 implements the proposed functions, procedures, and/or methods. Layers of a radio interface protocol can be implemented by the processor 110. The processor 110 assigns a plurality of serving cells to a UE, and transmits a UL grant including a UL DAI. In addition, the processor 110 decodes data and ACK/NACK included in a UL transport block. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. Layers of a radio interface protocol can be implemented by the processor 210. The processor 210 assigns a plurality of serving cells, and receives a UL grant through at least one serving cell among the plurality of configured serving cells. The processor 210 determines an ACK/NACK payload size on the basis of a UL DAI included in a UL grant, and generates ACK/NACK for a specific number of DL transport blocks, where the specific number is equal to the ACK/NACK payload size, in M DL subframes associated with a UL subframe. Thereafter, if required, the ACK/NACK can be compressed by applying spatial bundling, CC domain bundling, etc., and then can be fed back to the BS. In this case, the ACK/NACK can be transmitted on a PUSCH in a piggyback manner. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means. Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method of transmitting positive-acknowledgement (ACK)/negative-acknowledgement (NACK) of a user equipment in a time division duplex (TDD)-based wireless communication system in which M downlink subframes (where M≥1) are associated with an uplink subframe, the method comprising:

- receiving from a base station an uplink grant which includes an uplink resource assignment and an uplink downlink assignment index (DAI);
- receiving from the base station at least one downlink transport block in the M downlink subframes for each of a plurality of serving cells;
- determining an ACK/NACK payload size on the basis of a value of the uplink DAI;
- generating an ACK/NACK response for the at least one downlink transport block;
- multiplexing the ACK/NACK response on an uplink transport block; and
- transmitting to the base station the multiplexed ACK/NACK response by using the uplink resource assignment in the uplink subframe,
- wherein the ACK/NACK response is generated for a specific number of downlink transport blocks, where the specific number is equal to at least the ACK/NACK payload size,
- wherein the ACK/NACK response for the at least one downlink transport block is transmitted through a physical uplink shared channel (PUSCH) for transmitting at least one of uplink data and uplink control information,
- wherein the ACK/NACK response for the at least one downlink transport block is generated by bundling the ACK/NACK for a plurality of downlink transport blocks in each of the downlink subframes only when uplink control information is transmitted through the PUSCH,
- wherein the uplink DAI indicates a maximum value of the number of downlink subframes having at least one downlink transport block,
- wherein the at least one downlink transport block is received on a physical downlink shared channel (PDSCH) having its corresponding physical downlink control channel (PDCCH) or on a PDSCH not having its corresponding PDCCH, and
- wherein the at least one downlink transport block further includes a semi-persistent scheduling (SPS) release PDCCH indicating a release of semi-persistent scheduling.

2. The method of claim 1, wherein the downlink transport block includes at least one of data and control information requiring the ACK/NACK response.

3. The method of claim 1, wherein the ACK/NACK response for the at least one downlink transport block is generated by being bundled in a unit of serving cell.

4. The method of claim 1, wherein the downlink transport blocks are received on respective PDSCHs, and the respective PDSCHs are indicated by a downlink resource assignment in a downlink grant on corresponding PDCCHs, and wherein the downlink grant includes a DAI indicating an accumulative number of PDCCHs having assigned PDSCH transmission.

5. A user equipment for transmitting ACK/NACK in a TDD-based wireless communication system in which M downlink subframes (where M≥1) are associated with an uplink subframe, the user equipment comprising:

a radio frequency (RF) unit for transmitting a radio signal; and a processor coupled to the RF unit, wherein the processor is configured to:

receive from a base station an uplink grant which includes an uplink resource assignment and an uplink DAI;

receive from the base station at least one downlink transport block in the M downlink subframes for a plurality of respective serving cells;

determine an ACK/NACK payload size on the basis of a value of the uplink DAI;

generate an ACK/NACK response for the at least one downlink transport block;

multiplex the ACK/NACK response on an uplink transport block; and transmit to the base station the multiplexed ACK/NACK response by using the uplink resource assignment in the uplink subframe, wherein the ACK/NACK response is generated for a specific number of downlink transport blocks, where the specific number is equal to at least the ACK/NACK payload size, wherein the ACK/NACK response for the at least one downlink transport block is transmitted through a physical uplink shared channel (PUSCH) for transmitting at least one of uplink data and uplink control information, wherein the ACK/NACK response for the at least one downlink transport block is generated by bundling the ACK/NACK for a plurality of downlink transport blocks in each of the downlink subframes only when uplink control information is transmitted through the PUSCH, wherein the uplink DAI indicates a maximum value of the number of downlink subframes having at least one downlink transport block, wherein the at least one downlink transport block is received on a physical downlink shared channel (PDSCH) having its corresponding physical downlink control channel (PDCCH) or on a PDSCH not having its corresponding PDCCH, and wherein the at least one downlink transport block further includes a semi-persistent scheduling (SPS) release PDCCH indicating a release of semi-persistent scheduling.

* * * * *